United States Patent Office 3,660,565
Patented May 2, 1972

---

3,660,565
RUBELLA VACCINE AND METHOD
Stanley A. Plotkin, Philadelphia, Pa., assignor to The Wistar Institute, Philadelphia, Pa.
No Drawing. Filed Apr. 17, 1968, Ser. No. 721,926
The portion of the term of the patent subsequent to Dec. 1, 1987, has been disclaimed
Int. Cl. C12k 5/00, 7/00
U.S. Cl. 424—89                                     1 Claim

---

ABSTRACT OF THE DISCLOSURE

A rubella vaccine, capable of inducing immunity in humans, without spread to contacts and with reduced nasopharyngeal excretion of virus, is prepared by passing rubella virus in WI-38 human diploid lung fibroblasts.

---

This invention relates to a vaccine capable of inducing immunity against rubella and to a method of preparing said vaccine.

Research directed toward the development of an effective rubella vaccine has been stimulated in recent years by the epidemic of rubella embryopathy which occurred in the United States in 1964–1965. Unfortunately, the possibilities of developing an effective killed-virus vaccine have been hampered by difficulties in preserving immunogenicity after inactivation of the virus. The development of an attenuated vaccine, on the other hand, has been concerned with the need to eliminate or decrease virus excretion by vaccinees in order to prevent the spread of the disease to contacts, particularly pregnant women. A problem common to the development of both killed and attenuated rubella vaccines arises from the fact that they have heretofore been prepared by growing the virus in primary animal cultures such as monkey kidney, duck embryo, or rabbit kidney. There is abundant evidence that primary African green monkey has been found to harbor latent viruses, and concern has been voiced about the possibility that other viruses might be latent in primary animal cells.

The present invention provides a vaccine which is capable of inducing immunity against rubella, has been shown to result in a reduced nasopharyngeal excretion of virus, and has failed to show any evidence of spread to contacts. Furthermore, this vaccine, because of its mode of preparation, does not possess the capability of transmitting latent animal viruses to vaccinees. The invention also consists of a process for preparing the vaccine.

The vaccine of the present invention possesses the above-described advantages by virtue of its mode of preparation. The essential feature of the process is the propagation of rubella virus in human tissue, in particular, WI-38 human diploid lung fibroblasts. The WI-38 fibroblasts were originally derived from a single human lung; they are pedigreed in the sense that they have been extensively characterized biologically, biochemically, virologically, and genetically. This cell line is standardized, in contrast to conventionally used primary animal cells. It has been described in Exper. Cell Res. 25, 585 (1961) and has been deposited with the American Type Culture Collection and assigned the designation ATCC CCL-75. It has been made available to many laboratories and may be freely obtained from the Collection by anyone. The use of this cell line for the propagation of the virus minimizes the likelihood of latent animal viruses being transmitted to a vaccinee by means of the vaccine.

According to the present invention, the virus strain is passaged in WI-38 fibroblasts by terminal dilution at progressively lower incubation temperatures until the virus is attenuated to such a degree that virus excretion and spread of diseases to contacts are eliminated or minimized, while the capacity for achieving immunization is retained. It has been found that greater than 18, and up to at least 30, preferably 21 to 25, passages is the optimum number needed to achieve the desired attenuation.

Rubella virus which is to be used in preparing the vaccine may be obtained from an infected human fetus or from a typical clinical case by means of throat swabs, urine, or gargle samples. The samples are either frozen immediately and maintained at −60° until used or immediately inoculated into the tissue culture system.

Propagation of the human diploid lung fibroblasts may be carried out by any of the standard methods described in the literature. Specific examples of such propagation techniques are disclosed in Exper. Cell Res. 25, 585 (1961) and Virology 16, 147 (1962). The tissue culture system usually comprises Eagle's basal medium in Earle's balanced salt solution, supplemented with calf serum and containing a sterilizing amount of an antibiotic such as penicillin, streptomycin, chlortetracycline, or other antibiotic, or mixtures thereof, the system being buffered at a pH of about 6.8–8.5 with a conventional biological buffering agent such as an alkali metal bicarbonate, carbonate, or hydrogen phosphate.

The rubella virus is cultivated for vaccine use by inoculating the human diploid lung fibroblasts with virus harvested from the fetal tissue or with virus from the previous passage in the case of subsequent passages. Each incubation proceeds for a period of 14 days and is conducted at a temperature of about 30–35°. When the desired number of passages have been conducted, the harvested virus is subject to standard sterility tests for the presence of bacteria, fungi, mycoplasma, and other contaminating agents.

The virus is utilized as a vaccine by filtering the harvested material in order to remove cells or bacteria, and the filtrate is either frozen for later use or lyophilized and reconstituted with a solvent such as water. It may be administered subcutaneously or intranasally in the form of drops.

The following description of the preparation and testing of the rubella vaccine is intended to illustrate the invention, but is not to be construed as limiting its scope.

Procedure for obtaining virus

The rubella virus used was obtained from an aborted rubella-infected human fetus. The 25 year-old mother was exposed to rubella eight weeks after the last menstrual period. A macular rash and lymphadenopathy developed 16 days after exposure, and rubella virus was isolated from her nasopharynx on the second day of rash.

The fetus was surgically aborted 17 days after the maternal illness and dissected immediately. Explants from several organs were cultured and successful cell growth was achieved from lung, skin, and kidney. All cell strains were found to be carrying rubella. The nutrient medium used for tissue culture of the virus was Eagle's basal medium (BME) with 10% calf serum added when cell growth was desired. Double strength of amino acids and vitamins was incorporated into the medium for culture of explants. The concentration of antibiotics in each ml. of medium was 100 μg. of penicillin, 40 μg. of streptomycin, 50 μg. of chlortetracycline or 50 μg. of neomycin, and 20 μg. of nystatin. The organ explant technique used was that of Jensen et al., Exp. Cell Res. 34, 1296 (1963), in which bits of tissue are placed on metal grids at an air-nutrient medium interface.

Procedure for propagating virus

The harvest was inoculated on stationery WI-38 human diploid lung fibroblasts to initiate infection in these cells, and then subsequently passaged. Each passage was accomplished in the following manner: The undiluted virus from the previous passage, or a dilution of this virus, was inculated on confluent monolayers of WI-38 human diploid lung fibroblasts (0.1 ml. of inoculum for each 17 cm.$^2$ of monolayer). After 1 hour adsorption, the cells were covered with BME and 10% fetal calf serum and incubated at 35° for passages 1-8, 33° for passages 9-13, 30° passages 14-17, 35° for passage 18, 30° for passage 19, 35° for passage 20, 30° for passage 21, 30° for passages 22-24, and 35° for passage 25. One week after incubation, the monolayers were treated with trypsin and subcultivated (12 days postinoculation), the BME with serum was removed, and the cells washed three times with BME containing no serum. BME without added serum was left in the bottles, and two days later (14 days postinoculation) the supernatant fluid was harvested for further passage or for test in man.

Procedure for testing vaccine

Each pool used for inoculation was subjected to tests for the presence of bacteria, fungi, and mycoplasma by inoculation onto appropriate artificial media. Tests for safety in animals included injection of aliquots of the pool into adult mice (intraperitoneally and intracerebrally), suckling mice (intraperitoneally and intracerebrally), guinea pigs (intraperitoneally), and rabbits (subcutaneously). All animals remained well for six weeks.

Further tests for identity and for the absence of contaminating agents were performed in tissue culture. Primary African green monkey kidney, human embryo kidney, primary rabbit kidney, and WI-38 cells all were inoculated with aliquots of virus, either directly or after neutralization for 1 hour at 37° with rabbit antirubella virus serum. There was no evidence of any agent other than rubella in the pool. Inoculations of HEp-2 were also made. Titration of pools for quantity of rubella virus was performed by plaquing on $RK_{13}$ cells.

Results of testing vaccine in humans

The vaccine was tested on children in two institutions, an orphanage and a hospital for retarded children. In both institutions, the children were pretested for neutralizing antibody to rubella virus, and only seronegative children were included in the tests. Only personnel shown to be immune to rubella were permitted to care for the trial groups during the studies.

In the orphanage, the trial group was housed in a separate wing. To insure contact between the children, whose ages ranged between 1½ and 3 years, they shared a common play area within the wing.

In the hospital for retarded children, a floor of one building was set aside for the trial group. The children in this group, ages 4 to 13 years, were moderately to severely retarded. Contact between subjects was promoted by placing them together in a playroom for regular periods.

The viruses were inoculated in a volume of 0.1 to 0.5 ml. subcutaneously over the right deltoid. Clinical surveillance was maintained by daily inspection of the children.

Swabs were collected from the nose by inserting a cotton-tipped wire to the level of the turbinates. Throat swabs were made with cotton-tipped applicator sticks moved over the posterior pharynx. Both types of swabs were placed immediately in screwcap tubes containing Hanks' medium with 0.1 percent gelatin, 1000 μg. of penicillin, 1000 μg. of streptomycin and 400 μg. of mycostatin per ml. The specimens either were stored at 4° C. until inoculated into tissue cultures on the same day, or at −20° C. until tested within two weeks.

Tests for viremia were performed by collecting heparinized blood and allowing it to settle by gravity at 4° C. until leucocyte-rich plasma was obtained. After sonication for two minutes, the plasma was inoculated into tissue culture.

Antibody studies were done on serum from clotted blood specimens.

In trials 1-3, virus isolation was performed only in primary AGMK culture. Each specimen was inoculated into four AGMK tubes (0.1 ml. per tube) which were incubated for 10 days before challenge with $10^4$ $TCD_{50}$ of ECHO 11 virus. All specimens were passaged blindly one time. In trials 4 and 5, the same procedure was followed, but in addition two 50 mm. plates of $RK_{13}$ cells were inoculated with 0.4 ml. of specimen each. After one week's incubation, the plates were examined for cytopathic effect (CPE); the supernatants of all specimens were then harvested and inoculated on AGMK tubes for interference testing.

Rubella virus isolates were identified by neutralization of 10 to 50 $TCD_{50}$ of interfering virus with an antirubella rabbit serum (16 units of antibody) for one hour at 37°, and by inoculation of the mixture into AGMK.

The technique used for neutralization tests was that described by Plotkin, J. Am. Med. Assoc. 190, 265-268 (1964).

The antigen for the hemagglutination test (HAI) was prepared by the method of Furukawa et al., Nature, 215, 172-173 (1967). In all other respects the HAI test was performed as described by Stewart et al., New Engl. J. Med. 276, 554-557 (1967).

The vaccine was tested at various passage levels, the passage history and results being summarized in Tables 1 and 2 below:

TABLE 1

Passage history of rubella virus in WI-38 human fibroblasts

| Passage number | Temperature of incubation (C) | Concentration of inoculum | Trials in man (number) |
|---|---|---|---|
| 1-8 | 35 | Undiluted | 1, 2 |
| 9-13 | 33 | do | 3 |
| 14-17 | 30 | do | 3 |
| 18 | 35 | do | |
| 19 | 30 | Terminal dilution [1] | |
| 20 | 35 | Undiluted | |
| 21 | 30 | Terminal dilution | 4 |
| 22-24 | 30 | do | |
| 25 | 35 | Undiluted | 5 |

[1] Highest tenfold dilution that produced infection.

TABLE 2

Results of clinical trials of rubella virus at different passage levels in WI-38 tissue culture

| WI-38 passage | Nasopharyngeal virus (mean duration) days | Rash | Antibody response | Spread to contacts |
|---|---|---|---|---|
| 4 | 12 | 10/11 | 11/11 | 4/12 |
| 8 | 7 | 5/13 | 12/13 | 1/9 |
| 11 (35° C.)* | 3.0 | 2/2 | 2/2 | +N.T. |
| 14 (35° C.)* | 5.5 | 2/2 | 2/2 | N.T. |
| 15 | 0.5 | 0/2 | 2/2 | N.T. |
| 17 | 0 | 1/2 | 2/2 | N.T. |
| 21 | 0.1 | 1/12 | 12/12 | 0/7 |
| 25 | 0 | 0/5 | 5/5 | N.T. |

*Subline passaged at 35° C.  +N.T.=not tested.

TRIAL NO. 1

Virus from the 4th WI-38 passage was tested in eleven seronegative chlidren. All vaccinees developed antibodies, but 10 out of 11 developed rash and the mean nasopharyngeal secretion was 12 days. Infection also occurred in 4 of 12 seronegative children in contact with the vaccinees.

TRIAL NO. 2

A trial of the 8th passage of the virus was performed. Thirteen children were inoculated with either 10 or 30 plaque-forming units (PFU) of rubella virus. Nine seronegative chlidren served as contacts. The results are presented in Tables 2, 3 and 4. A mild papular erythematous rash appeared in 5 vaccinees but none of the contacts (Tables 2, 3). Virus was isolated in 12 vaccinees and in one contact (Table 3), all of whom developed antibodies to rubella (Table 4). The remaining vaccinee was apparently uninfected; neither he nor the eight other contacts became seropositive.

one of the sublines. In this small trial conducted in the orphanage, no studies of contact infection were made. All four children who received either the 11th or 14th WI-38 passage at 35° C. developed rash, and three of four excreted virus. The 15th passage at low temperature evoked no rash, and only one nasopharyngeal swab was positive for virus. Inoculation of the 17th-passage virus at 30° C.

TABLE 3

Rubella virus excretion during trial No. 2: 8th WI-38 passage of virus

| Patient number | Days post-inoculation | | | | | | | | | | | | | | | |
|---|---|---|---|---|---|---|---|---|---|---|---|---|---|---|---|---|
| | 0 | 3 | 7 | 9 | 11 | 13 | 14 | 16 | 18 | 21 | 24 | 28 | 31 | 35 | 38 | 42 |
| Vaccinees: | | | | | | | | | | | | | | | | |
| SV 429 | 0 | 0 | 0 | 0 | 0 | 0 | 0 | 0 | 0 | 0 | 0 | 0 | 0 | 0 | 0 | 0 |
| SV 465 | 0 | 0 | + | 0 | +R* | 0 | + | 0 | 0 | 0 | 0 | 0 | 0 | 0 | 0 | 0 |
| SV 466 | 0 | 0 | 0 | + | +L† | + | 0 | 0 | 0 | 0 | 0 | 0 | 0 | 0 | 0 | 0 |
| SV 469 | 0 | 0 | 0 | + | + | + | 0 | 0 | 0 | 0 | 0 | 0 | 0 | 0 | 0 | 0 |
| SV 496 | 0 | 0 | 0 | + | + | + | + | 0 | 0 | 0 | 0 | 0 | 0 | 0 | 0 | 0 |
| SV 512 | 0 | 0 | + | + | + | + | 0 | 0 | 0 | 0 | 0 | 0 | 0 | 0 | 0 | 0 |
| SV 515 | 0 | 0 | 0 | + | + | 0R | 0 | 0 | 0 | 0 | 0 | 0 | 0 | 0 | 0 | 0 |
| SV 521 | 0 | 0 | 0 | 0R | 0 | +L | + | 0 | 0 | 0 | 0 | 0 | 0 | 0 | 0 | 0 |
| SV 531 | 0 | 0 | + | +R | + | + | + | 0 | 0 | 0 | 0 | 0 | 0 | 0 | 0 | 0 |
| SV 535 | 0 | 0 | 0 | +R | + | 0 | + | 0 | 0 | 0 | 0 | 0 | 0 | 0 | 0 | 0 |
| SV 538 | 0 | 0 | + | + | + | + | 0 | + | + | + | 0 | 0 | 0 | 0 | 0 | 0 |
| SV 541 | 0 | 0 | 0 | 0 | 0 | 0 | + | 0 | 0 | 0 | 0 | 0 | 0 | 0 | 0 | 0 |
| SV 544 | 0 | 0 | + | + | + | + | 0 | 0 | 0 | 0 | 0 | 0 | 0 | 0 | 0 | 0 |
| Contacts: | | | | | | | | | | | | | | | | |
| SV 433 | 0 | 0 | 0 | 0 | 0 | 0 | 0 | 0 | 0 | 0 | 0 | 0 | 0 | 0 | 0 | 0 |
| SV 461 | 0 | 0 | 0 | 0 | 0 | 0 | 0 | 0 | 0 | 0 | 0 | 0 | 0 | 0 | 0 | 0 |
| SV 504 | 0 | 0 | 0 | 0 | 0 | 0 | 0 | 0 | 0 | 0 | 0 | 0 | 0 | 0 | 0 | 0 |
| SV 511 | 0 | 0 | 0 | 0 | 0 | 0 | 0 | 0 | 0 | 0 | 0 | 0 | 0 | 0 | 0 | 0 |
| SV 524 | 9 | 0 | 0 | 0 | 0 | 0 | 0 | 0 | 0 | 0 | 0 | 0 | 0 | 0 | 0 | 0 |
| SV 529 | 0 | 0 | 0 | 0 | 0 | 0 | 0 | 0 | 0 | 0 | 0 | 0 | 0 | 0 | 0 | 0 |
| SV 534 | 0 | 0 | 0 | 0 | 0 | 0 | 0 | 0 | 0 | 0 | 0 | 0 | 0 | 0 | 0 | 0 |
| SV 537 | 0 | 0 | 0 | 0 | 0 | 0 | 0 | 0 | 0 | 0 | 0 | 0 | 0 | 0 | 0 | 0 |
| SV 543 | 0 | 0 | 0 | 0 | 0 | 0 | 0 | 0 | 0 | 0 | + | 0 | 0 | 0 | + | 0 |

*R=Onset of rash.
†L=Onset of post auricular, sub-occipital lymphadenopathy.

TABLE 4

Rubella neutralizing antibodies before and six weeks after inoculation with 8th passage of virus: trial No. 2

| Vaccinees | | | Contacts | | |
|---|---|---|---|---|---|
| | Titers | | | Titers | |
| Patient No. | Pre | Post | Patient No. | Pre | Post |
| SV 429 | <4 | <4 | SV 433 | <4 | <4 |
| SV 465 | <4 | 8 | SV 461 | <4 | <4 |
| SV 466 | <4 | 16 | SV 504 | <4 | <4 |
| SV 469 | <4 | 8 | SV 511 | <4 | <4 |
| SV 496 | <4 | 32 | SV 524 | <4 | <4 |
| SV 512 | <4 | 16 | SV 529 | <4 | <4 |
| SV 515 | <4 | 16 | SV 534 | <4 | <4 |
| SV 521 | <4 | 32 | SV 537 | <4 | <4 |
| SV 531 | <4 | 8 | SV 543 | <4 | 8 |
| SV 535 | <4 | 64 | | | |
| SV 538 | <4 | 64 | | | |
| SV 541 | <4 | 16 | | | |
| SV 544 | <4 | 8 | | | | resulted in one atypical rash but no detectable virus excretion. All of the eruptions were mild, and none was characteristic of rubella. Rubella antibodies developed in all of the vaccinees in this trial (Table 5).

TABLE 6

Rubella neutralizing antibodies before and six weeks after inoculation of 11th to 17th passage of virus: trial No. 3

| | | Titers | |
|---|---|---|---|
| Passage level inoculated | Patient No. | Pre | Post |
| 11 | SV 540 | <4 | 64 |
| | SV 563 | <4 | 16 |
| 14(35° C.) | SV 551 | <4 | 16 |
| | SV 545 | <4 | 16 |
| 15(35° C.) | SV 539 | <4 | 16 |
| | SV 555 | <4 | 4 |
| 17 | SV 548 | <4 | 8 |
| | SV 552 | <4 | 8 |

TABLE 5

Rubella virus excretion during trial No. 3: 11th to the 17th WI-38 passage of virus

| | 0 | 3 | 7 | 9 | 11 | 13 | 16 | 19 | 22 | 24 | 28 |
|---|---|---|---|---|---|---|---|---|---|---|---|
| 11th passage (35° C.): | | | | | | | | | | | |
| SV 540 | 0 | 0 | 0 | 0 | +R+L† | + | + | 0 | 0 | 0 | 0 |
| SV 563 | 0 | 0 | 0 | 0 | 0 | 0 | 0 | 0RL | 0 | 0 | 0 |
| 14th passage (35° C.): | | | | | | | | | | | |
| SV 545 | 0 | 0 | 0 | + | + | +RL | 0 | 0 | 0 | 0 | 0 |
| SV 551 | 0 | 0 | 0 | 0 | 0 | +R | + | + | 0 | 0 | 0 |
| 15th passage (30° C.): | | | | | | | | | | | |
| SV 539 | 0 | 0 | 0 | 0 | 0 | + | 0 | 0 | 0 | 0 | 0 |
| SV 555 | 0 | 0 | 0 | 0 | 0 | 0 | 0 | 0 | 0 | 0 | 0 |
| 17th passage (30° C.): | | | | | | | | | | | |
| SV 548 | 0 | 0 | 0 | 0L | 0 | 0R | 0 | 0 | 0 | 0 | 0 |
| SV 552 | 0 | 0 | 0 | 0 | 0 | 0 | 0 | 0 | 0 | 0 | 0 |

*R=Onset of rash.
†L=Onset of post auricular, sub-occipital lymphadenopathy.

TRIAL NO. 3

Two sublines of the virus, one of which was passaged at 35° C. and the other at lower temperatures, were tested in the 11th to the 17th WI-38 pasage. The results are given in Tables 2, 5 and 6. Eight subjects received 300 PFU of

TRIAL NO. 4

The low-temperature subline of trial 3 was further passaged, as described in Table 1. At the 21st passage trial was performed in the hospital for retarded children. Fourteen children were included in the trial; seven were vaccinated with 500 PFU of virus and seven were controls. The results are given in Tables 2 and 7. No virus was recovered from the nasopharynges of either vaccines or contacts, although one child developed a rash and lymphadenopathy. Although all vaccinees developed antibodies to rubella, the contact children remained seronegative (Table 8). At 11 days postinoculation, no virus was found in blood samples. The virus from the 21st passage may thus be acceptable for vaccine purposes.

TABLE 7

Rubella virus excretion during trial No. 4: 21st WI-38 passage of virus

| | Days post-inoculation | | | | | | | | | | | |
|---|---|---|---|---|---|---|---|---|---|---|---|---|
| | 0 | 7 | 9 | 11 | 13 | 15 | 17 | 21 | 24 | 28 | 31 | 34 | 42 |
| Vaccinees: | | | | | | | | | | | | |
| 30 V | 0 | 0 | 0 | 0L* | 0 | 0 | 0 | 0 | 0 | 0 | 0 | 0 | 0 |
| 33 V | 0 | 0 | 0 | 0 | 0 | 0 | 0 | 0 | 0 | 0 | 0 | 0 | 0 |
| 35 V | 0 | 0 | 0 | 0 | 0 | 0 | 0 | 0 | 0 | 0 | 0 | 0 | 0 |
| 43 V | 0 | 0 | 0 | 0RL† | 0 | 0 | 0 | 0 | 0 | 0 | 0 | 0 | 0 |
| 45 V | 0 | 0 | 0 | 0 | 0 | 0 | 0 | 0 | 0 | 0 | 0 | 0 | 0 |
| 48 V | 0 | 0 | 0 | 0 | 0 | 0 | 0 | 0 | 0 | 0 | 0 | 0 | 0 |
| 51 V | 0 | 0 | 0 | 0 | 0 | 0 | 0 | 0 | 0 | 0 | 0 | 0 | 0 |
| Contacts: | | | | | | | | | | | | |
| 4 C | 0 | 0 | 0 | 0 | 0 | 0 | 0 | 0 | 0 | 0 | 0 | 0 | 0 |
| 22 C | 0 | 0 | 0 | 0 | 0 | 0 | 0 | 0 | 0 | 0 | 0 | 0 | 0 |
| 23 C | 0 | 0 | 0 | 0 | 0 | 0 | 0 | 0 | 0 | 0 | 0 | 0 | 0 |
| 29 C | 0 | 0 | 0 | 0 | 0 | 0 | 0 | 0 | 0 | 0 | 0 | 0 | 0 |
| 49 C | 0 | 0 | 0 | 0 | 0 | 0 | 0 | 0 | 0 | 0 | 0 | 0 | 0 |
| 52 C | 0 | 0 | 0 | 0 | 0 | 0 | 0 | 0 | 0 | 0 | 0 | 0 | 0 |
| 53 C | 0 | 0 | 0 | 0 | 0 | 0 | 0 | 0 | 0 | 0 | 0 | 0 | 0 |

*L = onset of post-auricular, sub-occipital lymphadenopathy.
†R = onset of rash.

TABLE 8

Rubella neutralizing antibodies before and six weeks after inoculation with 21st passage of virus: trial No. 4

| Vaccinees | Pre | Post | Contacts | Pre | Post |
|---|---|---|---|---|---|
| 30 | <4 | 64 | 4 | <4 | <4 |
| 33 | <4 | 8 | 22 | <4 | <4 |
| 35 | <4 | 16 | 23 | <4 | <4 |
| 43 | <4 | 32 | 29 | <4 | <4 |
| 45 | <4 | 32 | 49 | <4 | <4 |
| 48 | <4 | 64 | 52 | <4 | <4 |
| 51 | <5 | 8 | 53 | <4 | <4 |

TRIAL NO. 5

The last trial was conducted in the orphanage. As in trial 3, we sought only to determine the extent of virus excretion by vaccines, without attempting to study spread per se. Ten children participated, five of whom received 500 PFU of 21st passage virus, and the rest 500 PFU of 25th passage. The results can be seen in Tables 9 and 10. In this trial neither the 21st nor the 25th passage preparations provoked eruptions or lymphadenopathy. Virus excretion was detected in the nasopharynges of two of the five children who received 21st passage virus (Table 9) but none was detected in those given the 25th passage virus. All children developed both neutralizing and hemagglutinin-inhibiting antibody. Hemagglutinin-inhibiting antibody was present at considerably higher dilutions than neutralzing antibody.

Virus from the 21st to 25th passage in WI-38 is thus safe and effective for use as a vaccine. Further passages up to at least 30 are also suitable for vaccine use.

TABLE 9

Rubella virus excretion during trial Mo. 5: 21st and 25th WI-38 passage of virus

| | Days post-inoculation | | | | | | | | | | |
|---|---|---|---|---|---|---|---|---|---|---|---|
| | 0 | 7 | 8 | 9 | 10 | 11 | 12 | 13 | 14 | 16 | 18 | 20 |
| 21st passage: | | | | | | | | | | | | |
| SV 581 | 0 | 0 | 0 | 0 | 0 | 0 | 0 | 0 | 0 | 0 | 0 | 0 |
| SV 601 | 0 | 0 | 0 | 0 | 0 | 0 | 0 | 0 | 0 | 0 | + | 0 |
| SV 607 | 0 | 0 | 0 | 0 | 0 | 0 | 0 | 0 | 0 | 0 | 0 | 0 |
| SV 612 | 0 | 0 | + | 0 | 0 | 0 | 0 | 0 | 0 | 0 | 0 | 0 |
| SV 615 | 0 | 0 | 0 | 0 | 0 | 0 | 0 | 0 | 0 | 0 | 0 | 0 |
| 25th passage: | | | | | | | | | | | | |
| SV 602 | 0 | 0 | 0 | 0 | 0 | 0 | 0 | 0 | 0 | 0 | 0 | 0 |
| SV 611 | 0 | 0 | 0 | 0 | 0 | 0 | 0 | 0 | 0 | 0 | 0 | 0 |
| SV 613 | 0 | 0 | 0 | 0 | 0 | 0 | 0 | 0 | 0 | 0 | 0 | 0 |
| SV 614 | 0 | 0 | 0 | 0 | 0 | 0 | 0 | 0 | 0 | 0 | 0 | 0 |
| SV 616 | 0 | 0 | 0 | 0 | 0 | 0 | 0 | 0 | 0 | 0 | 0 | 0 |

TABLE 10

Rubella neutralizing and hemagglutin-inhibiting antibodies before and one month after inoculation with 21st or 25th passage of virus: trial No. 5

| | Antibody titers— | | | |
|---|---|---|---|---|
| | Pre | | Post | |
| Patient number | Neut. | Hemagglutinin-inhibiting | Neut. | Hemagglutinin-inhibiting |
| 21st passage: | | | | |
| SV 581 | <4 | <10 | 32 | >320 |
| SV 601 | <4 | <10 | 16 | >320 |
| SV 607 | <4 | <10 | 8 | 160 |
| SV 612 | <4 | <10 | 4 | 320 |
| SV 615 | <4 | <10 | 16 | >320 |
| 25th passage: | | | | |
| SV 602 | <4 | <10 | 8 | >320 |
| SV 611 | <4 | <10 | 8 | >320 |
| SV 613 | <4 | <10 | 8 | 160 |
| SV 614 | <4 | <10 | 4 | 40 |
| SV 616 | <4 | <10 | 4 | 80 |

I claim:
1. A rubella vaccine containing an antigenically effective amount of rubella virus, when prepared by serially passaging a rubella virus strain from 21 to 30 times in WI-38 human diploid lung fibroblasts, ATCC No. CCL-75, at about 30–35°.

References Cited

UNITED STATES PATENTS 3,401,084   9/1968   Buynak et al. _____ 195—1.3

OTHER REFERENCES

Plotkin et al., Science, vol. 156, May 1967, pp. 659–661.
Plotkin et al., American Journal of Epidemiology, vol. 86, pp. 468–477, September 1967.

RICHARD L. HUFF, Primary Examiner

U.S. Cl. X.R.
195—1.3